United States Patent
Pasch

(10) Patent No.: US 9,562,471 B1
(45) Date of Patent: Feb. 7, 2017

(54) METHOD FOR CONTROLLING START-UP AND STEADY STATE PERFORMANCE OF A CLOSED SPLIT FLOW RECOMPRESSION BRAYTON CYCLE

(71) Applicant: Sandia Corporation, Albuquerque, NM (US)

(72) Inventor: James Jay Pasch, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 123 days.

(21) Appl. No.: 14/267,137

(22) Filed: May 1, 2014

Related U.S. Application Data

(60) Provisional application No. 61/818,164, filed on May 1, 2013.

(51) Int. Cl.
| | | |
|---|---|---|
| F02C 1/10 | (2006.01) | |
| F01D 19/00 | (2006.01) | |
| F01K 7/16 | (2006.01) | |
| F01K 7/32 | (2006.01) | |
| G05B 15/02 | (2006.01) | |
| F02C 1/04 | (2006.01) | |
| F02C 1/06 | (2006.01) | |
| F01D 17/00 | (2006.01) | |
| F01D 17/02 | (2006.01) | |

(52) U.S. Cl.
CPC .............. F02C 1/10 (2013.01); F01D 17/00 (2013.01); F01D 17/02 (2013.01); F01D 19/00 (2013.01); F01K 7/165 (2013.01); F01K 7/32 (2013.01); F02C 1/04 (2013.01); F02C 1/06 (2013.01); G05B 15/02 (2013.01)

(58) Field of Classification Search
CPC .............. F02C 1/10; F02C 1/06; F02C 1/04; F01D 17/00; F01D 19/00; F01D 17/02; G05B 15/02; F01K 7/32; F01K 7/165
USPC .................... 60/650, 682–684, 660
See application file for complete search history.

(56) References Cited

U.S. PATENT DOCUMENTS

| | | | | |
|---|---|---|---|---|
| 7,966,868 B1* | 6/2011 | Sonnichsen | ........... | F01D 25/285 73/112.01 |
| 8,424,284 B2* | 4/2013 | Staffend | ........... | F01C 1/3441 123/236 |
| 8,820,083 B2* | 9/2014 | Davidson | ........... | H02J 4/00 60/671 |
| 2012/0000204 A1* | 1/2012 | Kesseli | ........... | F02C 3/107 60/778 |
| 2012/0067055 A1* | 3/2012 | Held | ........... | F02C 7/12 60/772 |
| 2012/0324903 A1* | 12/2012 | Dewis | ........... | F02C 7/143 60/772 |
| 2013/0033044 A1* | 2/2013 | Wright | ........... | F02C 9/00 290/1 R |

* cited by examiner

Primary Examiner — Hoang Nguyen
(74) Attorney, Agent, or Firm — Daniel J. Jenkins

(57) ABSTRACT

A method of resolving a balanced condition that generates control parameters for start-up and steady state operating points and various component and cycle performances for a closed split flow recompression cycle system. The method provides for improved control of a Brayton cycle thermal to electrical power conversion system. The method may also be used for system design, operational simulation and/or parameter prediction.

9 Claims, 4 Drawing Sheets

METHOD FOR CONTROLLING START-UP AND STEADY STATE PERFORMANCE OF A CLOSED SPLIT FLOW RECOMPRESSION BRAYTON CYCLE

CROSS-REFERENCE TO RELATED APPLICATIONS

This application claims benefit of U.S. Provisional Patent Application No. 61/818,164, "METHOD FOR CONTROLLING STEADY STATE PERFORMANCE OF A CLOSED SPLIT FLOW RECOMPRESSION BRAYTON CYCLE", filed May 1, 2013, which is incorporated by reference herein in its entirety.

GOVERNMENT RIGHTS

The Government has rights to this invention pursuant to Contract No. DE-AC04-94AL85000 awarded by the U.S. Department of Energy.

FIELD

The invention relates generally to a method of controlling a closed split flow recompression Brayton cycle power generation system, and more particularly to a method of predicting a closed split flow recompression Brayton cycle power generation system operating at high temperature utilizing supercritical $CO_2$.

BACKGROUND OF THE INVENTION

Due to environmental concerns as well as increasing population, environmentally friendly and efficient power generation systems are desired. While there have recently been advances in systems that utilize renewable resources, such as solar power, wind, geothermal energy, and the like, efficiencies of such systems trail conventional turbine-based power generation systems, and costs of building such systems are relatively high. Moreover, systems that utilize renewable resources generally output variable amounts of electrical power depending upon environmental factors, such as, but not limited to cloud cover and wind speeds.

Supercritical Brayton cycle power generation systems have been proposed and theorized as efficient power generation systems. Advantages of supercritical Brayton cycle power generation systems include the utilization of an environmentally friendly, naturally occurring compound such as carbon dioxide. Additional advantages of supercritical Brayton cycle power generation systems include a relatively small footprint when compared to conventional turbine-based power generation systems. Moreover, supercritical Brayton cycle power generation systems have been theorized to have efficiencies that meet or exceed efficiencies of conventional power generation systems.

Supercritical Brayton cycle power generation systems offer a promising approach to achieving higher efficiency and more cost-effective power conversion when compared to existing steam-driven power plants, and also perhaps gas turbine power plants. A supercritical Brayton cycle power generation system is a power conversion system that utilizes a single-phase fluid operating near the critical temperature and pressure of such fluid. Generally, two types of power conversion cycles have been proposed: a recuperated Brayton cycle and a recompression Brayton cycle. Other types of power cycles, such as a power take off cycle, cycles with reheat or inter-cooling, split-flow compressor discharge cycles that heat a fraction flow rather than recuperate it, or cycles that feed all or a portion of the high pressure flow directly to a turbine while the low pressure flow leg provides the heating can also be utilized, wherein such cycles employ a Brayton cycle.

At this time, a method for predicting a balanced steady state operating point and operating conditions of a split flow recompression Brayton cycle from initial estimated parameter input conditions has not been developed.

A need remains, therefore, for a method to predict and optimize a split flow recompression Brayton cycle balanced operating steady state set of conditions using specified component performance characterizations.

SUMMARY OF THE INVENTION

According to an embodiment of the disclosure, a method is disclosed that includes the following steps:
- a first step of providing a thermodynamic and mass flow model of a closed split flow recompression Brayton cycle power generation system;
- a second step of inputting an estimate of the temperature at the exit of the LT recuperator;
- a third step of inputting an estimate of the total mass flow of the system;
- a fourth step of inputting an estimate of the mass flow split between the primary and secondary compressors;
- a fifth step of calculating the primary compressor and secondary compressor operating conditions from the thermodynamic and mass flow model based on the input conditions;
- a sixth step of comparing the fluid pressure at the secondary compressor outlet calculated in the fifth step to the fluid pressure on the high pressure side at the LT recuperator outlet, and if those pressures not equal then inputting a new mass flow split into the fourth step, and if those pressures are equal then proceeding to a seventh step, and if not iteratively repeating the step until they are equal;
- the seventh step that includes calculating primary turbine and secondary turbine operating conditions from the thermodynamic and mass flow model based on the input conditions;
- an eighth step that includes comparing the mass flow calculated by the mass flow program to the mass flow estimate input in the third step, and if those values are equal, then proceeding to the ninth step, and if not equal then inputting a new mass flow into the third step until those values are equal;
- a ninth step calculating the HT and LT recuperator conditions;
- a tenth step that includes comparing the outlet temperature of the low pressure side of the LT recuperator calculated by the system to thermodynamic model the outlet temperature of the low pressure side of the LT recuperator estimated in step two, if those values are not equal, then returning to the second step and inputting a new estimate of the temperature at the exit of the LT recuperator until those values are equal, and then proceeding to the eleventh step; and wherein
- the eleventh step identifies and produces start-up and steady state operating conditions set points that are used to start-up and operate a closed split flow recompression Brayton Cycle system.

According to another embodiment of the disclosure, a non-transitory machine-readable medium in communication with at least one processor is disclosed, the non-transitory machine-readable medium storing instructions, which, when executed by the at least one processor of a machine, causes one or more operating conditions to be determined and input as an operational parameter into the operating conditions of a closed split flow recompression Brayton cycle power generation system; wherein the operating conditions are selected from a group consisting of primary and secondary TAC speeds, heater input, mass flow split between the primary and secondary compressors, and amount of heat rejection.

An object of the present invention is to determine start-up and operating parameters that can be set by the system operator that allow for stability during both start-up and steady state operation.

Another object of the present invention is to use measured data and evaluate the current operating performance of the power conversion cycle, i.e, the power conversion efficiency.

Another object of the present invention is to assess the potential power conversion efficiency given the boundary conditions and the environment.

An advantage of the present invention is to determine appropriate changes to the operating conditions of the power conversion cycle, based on comparison of actual and potential power conversion efficiencies, so as to maximize efficiency.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

DETAILED DESCRIPTION OF THE INVENTION

The present disclosure is directed to a method of setting a balanced condition by setting select start-up and steady state operating parameters and various component and cycle performance parameters for a closed split flow recompression. The method provides for improved control of a Brayton cycle thermal to electrical power conversion system. The method may also be used for system design and operational simulation and/or parameter prediction.

Figure 1:
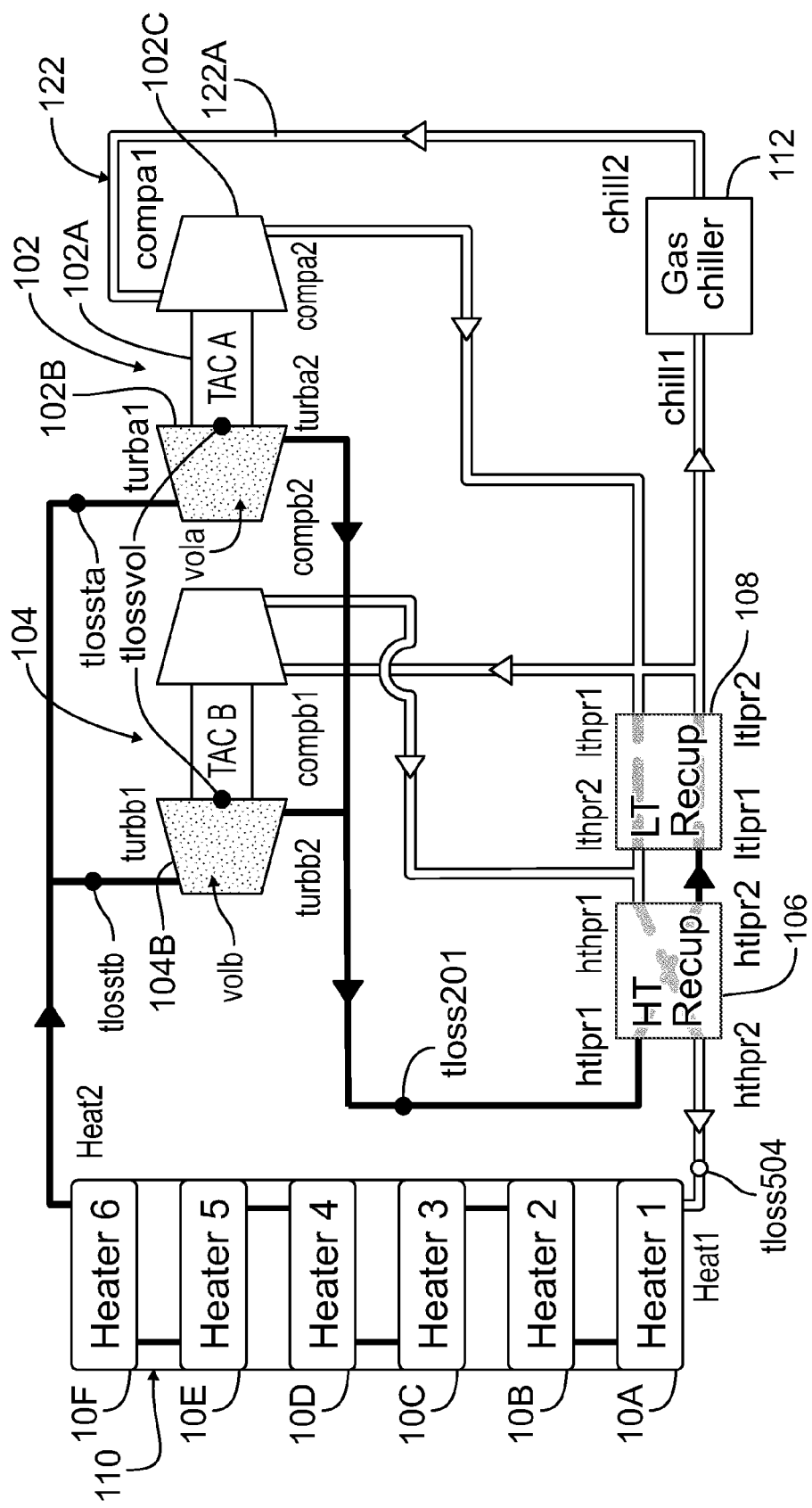
FIG. 1 shows an embodiment of a closed split flow recompression Brayton Cycle system according to the disclosure

FIG. 1 shows an embodiment of a closed split flow recompression Brayton Cycle system (system) 100 according to the disclosure. As can be seen in FIG. 1, the system 100 includes a primary turbine-alternator-compressor (TAC) 102, a secondary TAC 104, a high temperature (HT) recuperator 106, a low temperature (LT) recuperator 108, a heater 110, a heat exchanger 112, secondary compressor flow valve 116, primary compressor feel line flow meter 120, secondary compressor feed line flow meter 120, and a piping system 122A. The piping system 122 includes several piping sections or lines, which will be discussed in more detail below. The system 100 may include other components, such as, but not limited to flow valves and flow meters (not shown) used to operate the system 100.

The primary TAO 102 includes a primary motor/generator 102A, a primary turbine 102B and a primary compressor 102C. In this exemplary embodiment, the primary motor/generator 102A, a primary turbine 102B and a primary compressor 102C are arranged in a primary TAO 102 arrangement, however, in other embodiments the primary motor/generator 102A, a primary turbine 102B and a primary compressor 102C may be one or more separate, connected components.

The secondary TAO 104 includes a secondary motor/generator 104A, a secondary turbine 104B and a secondary compressor 104C. In this exemplary embodiment, the primary motor/generator 104A, a primary turbine 102B and a primary compressor 104C are arranged in a primary TAO 104 arrangement, however, in other embodiments the primary motor/generator 104A, a primary turbine 104B and a primary compressor 104C may be one or more separate, connected components.

The system 100 circulates a working fluid between the system components. The fluid may be any fluid capable of expanding and driving a turbine and being compressed. In an embodiment, the fluid may be selected from a group including ammonia, ethane, xenon, trichlorofluoromethane, and carbon dioxide. In an embodiment, the fluid may be supercritical carbon dioxide ($SCO_2$).

As shown in FIG. 1, the fluid is provided to an inlet 124 of the primary compressor 102C via a primary compressor feed line 122A. The fluid is compressed by the primary compressor 102C and exits the primary compressor 102C via an outlet 126 to a primary discharge high pressure line 122B. The primary discharge high pressure line 122B provides the fluid to the LT recuperator 108 and then to a high pressure fluid junction 128. The high pressure fluid junction 128 may be a piping Tee, mixing chamber or other device for combining fluids. At the high pressure fluid junction, the high pressure fluid in the primary discharge high pressure line 122B is combined with other high pressure fluid from a secondary discharge high pressure line 122C. The two combined high pressure fluids exit the high pressure fluid junction 128 into a high pressure fluid line 122D.

The high pressure fluid line 122D provides fluid to the HT recuperator 106 and then to the heater 110, where the temperature of the fluid is increased. In this exemplary embodiment, the heater 110 includes six heater banks, labeled 110A through 110F. In another embodiment, the heater 110 may include one or more heater banks capable of increasing the temperature of the fluid to a desired temperature.

After passing through the heater 110, the high pressure fluid line 122D provides the fluid to a fluid splitter 130, where the fluid is split between a primary turbine feed line 132 and a secondary turbine feed line 134. The primary turbine feed line 132 provides fluid to an inlet 136 of the primary turbine 102B. At the primary turbine 102B, the fluid drives or powers the primary turbine 102B to rotate a primary shaft (not shown) to power the primary generator/motor 102A and the primary compressor 102C. the secondary turbine feed line 134 provides fluid to an inlet 138 of the secondary turbine 104B to rotate a secondary shaft (not shown) to power the secondary generator/motor 104A and the secondary compressor 104C.

Fluid exits the primary turbine 102B via outlet 140 and is provided to a primary turbine discharge line 122G. Fluid exits the secondary turbine 104B via outlet 144 and is provided to a secondary turbine discharge line 122H. Fluid from the primary turbine discharge line 122G and the secondary turbine discharge line 122H are combined at a low pressure fluid junction 148. The low pressure fluid junction 148 may be a piping Tee, mixing chamber or other device for combining fluids.

Fluid exits the low pressure fluid junction 148 to a low pressure feed line 122I, which first passes through the HT recuperator 106 and then the LT recuperator 108 before entering a fluid splitter 150. At the fluid splitter 150, fluid is split between the primary turbine feed line 122A and a secondary turbine feed line 122J, and includes a valve or other proportioning device (not shown) for controlling the split of the fluid. Fluid from the secondary turbine feed line 122J enters inlet 152 of the secondary compressor 104C, where the fluid is compressed and discharged via an outlet 154 to secondary discharge high pressure line 122C.

At the HT recuperator 106, heat is transferred from the high temperature, low pressure fluid in the low pressure feed line 122I to low temperature, high pressure fluid in the high pressure line 122D. At the LT recuperator 108, additional heat is transferred from fluid in the low pressure feed line 122I to fluid in the primary discharge high pressure line 122B.

As can be appreciated from the system 100 described above, the initial and steady state settings of operating conditions are critical in the operation of the system 100. For example, stable start-up and operating conditions require that fluid being combined, such as at high pressure fluid junction 128, be of the same pressure. Additionally for example, stable start-up and operating conditions require maximizing the power generated at the turbines, while minimizing the power consumed by the compressors and losses. Doing so maximizes the ratio of net electrical power generated by the cycle to heating power input at the heater. Because the recompression cycle is highly internally recuperated, the calculation for this maximum efficiency is highly non-linear and requires iterative calculations to determine the appropriate changes necessary to increase conversion efficiency). The amount of heat transfer at the heat exchanger 112, HT recuperator 106, LT recuperator 108, and heater 110, as well as primary and secondary TAO 102, 104 operating speeds determines the temperature and pressures at primary and secondary compressors 102C, 104C. According to the present disclosure, these variables are determined so that the operating conditions may be set to allow for stable start-up and operating conditions.

According to an embodiment, a method of determining the start-up and operating steady state conditions of a closed split flow recompression Brayton Cycle system is disclosed. The method includes a user sets primary and secondary TAC speeds, and estimates main compressor inlet pressure and temperature, heater discharge temperature, total mass flow recompressor inlet temperature and fractional pressure drop across the components. This data is provided to an input file.

An algorithm is applied to this data that determines component performance characteristics with minimum in user-defined thermodynamic and operating conditions to resolve a balanced operating point. The method provides a useful, robust, and stable methodology that quickly generates predictions for steady state operating points given user inputs and initial estimates, and that lends itself well to easy modifications and distribution.

According to an embodiment, the methodology is encoded in an algorithm that provides the parameter determinations. The methodology is embedded within a non-transitory machine-readable medium in communication with at least one processor, the non-transitory machine-readable medium storing instructions which, when executed by the at least one processor of a machine, causes the machine to perform operations including agent movement and sensor operation. The processor may include one or more central processing units (CPUs) and may be physically installed in computing platforms such as but not limited to netbooks, personal computers PCs. The non-transitory machine-readable mediums may include one or more memory units such as, but not limited to RAM, ROM, hard drives, and solid state memory.

Figure 2:
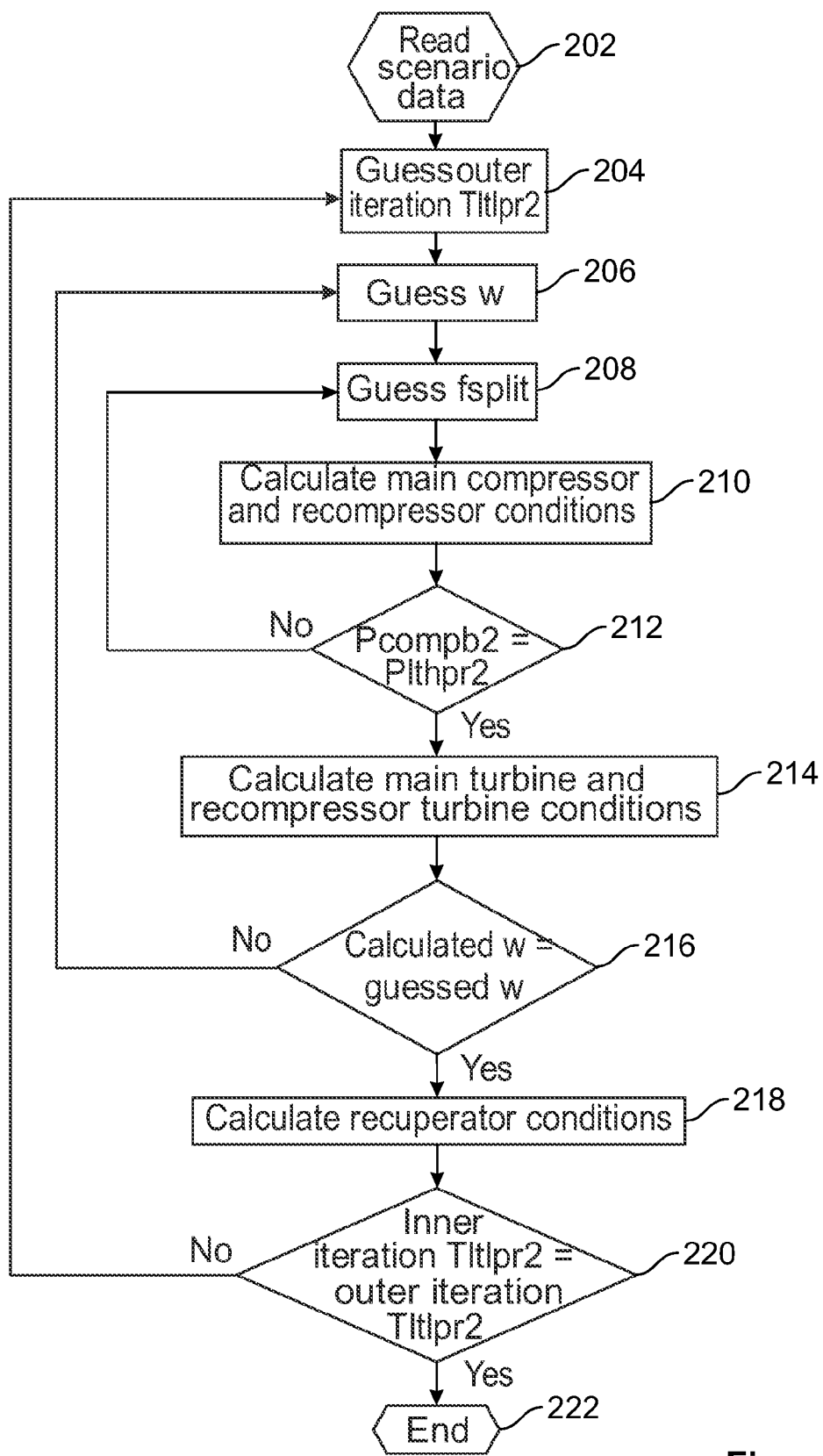
FIG. 2 shows an illustration of an embodiment of the disclosed methodology according to an embodiment of the disclosure.

FIG. 2 illustrates an embodiment of the disclosed methodology. As can be seen in FIG. 2, the resolving algorithm implements a hierarchy of nested iterative loops. The outermost iterative loop resolves the temperature at the low temperature recuperator low pressure discharge (TLTLPR2). The next inner loop resolves the total mass flow of the cycle (w). The next inner loop resolves the mass flow split between the two compressors (fsplit). After these three iterative loops have resolved the low temperature recuperator low pressure discharge temperature, the total mass flow, and the mass flow split between the two compressors, the calculation of recuperator conditions is performed by a subset of two nested iterative loops, shown in FIG. 3, calculate a balanced solution for the recuperator conditions. In all, five iterative loops are balanced to produce a predicted overall balanced operating point for the modeled split flow recompression cycle and user input.

Referring to FIG. 2, the method includes a first step 202 including inputting system data. Inputting system data includes providing a thermodynamic and mass flow model for all system components and inputting main compressor inlet temperature and pressure, heater discharge temperature, and the speeds of each TAO.

The method further includes a second step 204 of inputting an estimate of the pressure at the exit of the LT recuperator.

The method further includes a third step 206 of inputting an estimate of the total mass flow of the system.

The method further includes a fourth step 208 of inputting an estimate of the mass flow split between the primary and secondary compressors.

The method further includes a fifth step 210 that includes calculating the primary compressor and secondary compressor operating conditions from the thermodynamic and mass flow model based on the input conditions. These operating conditions include, but are not limited to the thermodynamic state of the discharged.

The method further includes a sixth step 212 that includes comparing the fluid pressure at the secondary compressor outlet (secondary discharge high pressure line) to the fluid pressure on the high pressure side (primary turbine feed line) at the LT recuperator outlet calculated in the fifth step 210, and if those pressures not equal to within an error band defined by the user, then inputting a new mass flow into the fourth step 206, and if those pressures are equal then proceeding to the seventh step 214, and if not iteratively repeating the step until they are equal.

The method further includes the seventh step 214 that includes calculating primary turbine and secondary turbine operating conditions from the thermodynamic and mass flow model based on the input conditions. These operating conditions include, but are not limited to the mass flow rate for each turbine, and the discharge temperature of the fluid.

The method further includes a eighth step 216 that includes comparing the mass flow calculated by the mass flow program to the mass flow estimate input in the third step 206, and if those values are equal, then proceeding to the ninth step 218, and if not equal then inputting a new mass flow split into the fourth step 208 until those values are equal.

Figure 3:
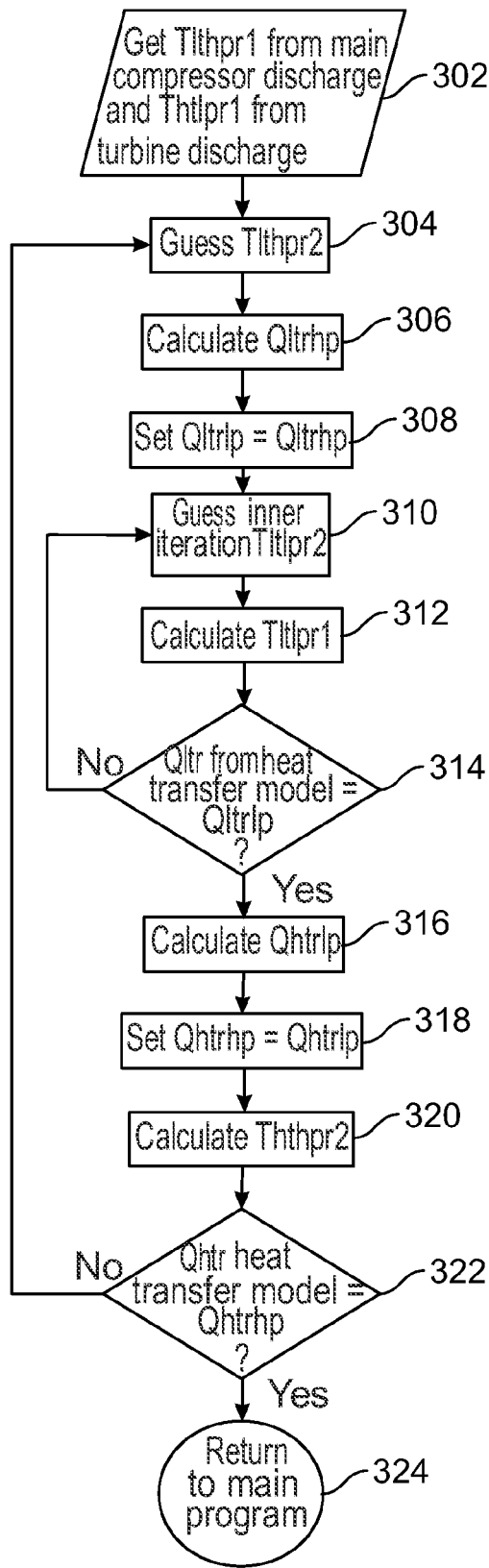
FIG. 3 shows an illustration of a sub-part of the disclosed methodology of FIG. 2.

The method further includes an ninth step 218 of calculating the HT and LT recuperator conditions, which is further described in referenced to FIG. 3.

FIG. 3 shows an embodiment of a method for performing the ninth step 218 of FIG. 2. As can be seen in FIG. 3, the ninth step 218 includes a first sub-step 302 that includes inputting the temperature of the LT recuperator at the high pressure side inlet and the temperature of the HT recuperator at the low pressure side inlet into the recuperator heat transfer performance models.

The method further includes a second sub-step 304 of inputting an estimate of the temperature at the outlet of the LT recuperator on the high pressure side.

The method further includes a third sub-step 306 of calculating the heat transfer rate (Q) from the high pressure side of the LT recompressor.

The method further includes a fourth sub-step 308 of setting the Q of the low pressure side of the LT recuperator equal to the calculated Q from the high pressure side of the LT recuperator.

The method further includes a fifth sub-step 310 of inputting the outlet temperature of the LT recuperator on the low pressure side.

The method further includes a sixth sub-step 312 of calculating the inlet temperature of the LT recuperator on the low pressure side.

The method further includes a seventh sub-step 314 of comparing the Q for the thermodynamic operating conditions of the LT recuperator to the Q calculated from the heat transfer model portion of the thermodynamic model, and if the values are equal then proceeding to the eighth sub-step 316, or if not equal, then returning to the fifth sub-step 310 and inputting a new outlet temperature of the LT recuperator on the low pressure side until the values are equal.

The method further includes the eighth sub-step 316 of calculating Q from the low pressure side of the HT recuperator.

The method further includes a ninth sub-step 318 of setting the Q for the high pressure side of the HT recuperator equal to the calculated Q from the low pressure side of the HT recuperator from the eighth step 316.

The method further includes a tenth sub-step 320 of calculating the outlet temperature of the high pressure side of the HT recuperator.

The method further includes an eleventh sub-step 322 of comparing the calculated Q of the HT recuperator from the heat transfer model to the Q of the high pressure side of the HT recuperator set in the ninth sub-step 318, and if those values are equal then proceeding to the twelfth sub-step 324, or if not equal, then returning to the second sub-step 304 and inputting a new estimate of the temperature at the outlet of the LT recuperator on the high pressure side until those values are equal.

The method further includes the twelfth sub-step 324 of returning to the tenth step 220 of FIG. 2.

Referring again to FIG. 2, the method further includes a tenth step 220 that includes comparing the outlet temperature of the low pressure side of the LT recuperator calculated by the system thermodynamic mode to the outlet temperature of the low pressure side of the LT recuperator calculated by the recuperator thermodynamic model shown in FIG. 3. If those values are not equal, then returning to the second step 204 and inputting a new estimate of the pressure at the exit of the LT recuperator until those values are equal, and then proceeding to the eleventh step 220.

The eleventh step 200 identifies and produces start-up and steady state operating conditions set points that are used to start-up and operate a closed split flow recompression Brayton Cycle system. The start-up and steady state operating conditions set points include primary and secondary TAC speeds, heater input, mass flow split between the primary and secondary compressors, and the amount of heat rejected at the heat rejection heat exchanger.

Figure 4:
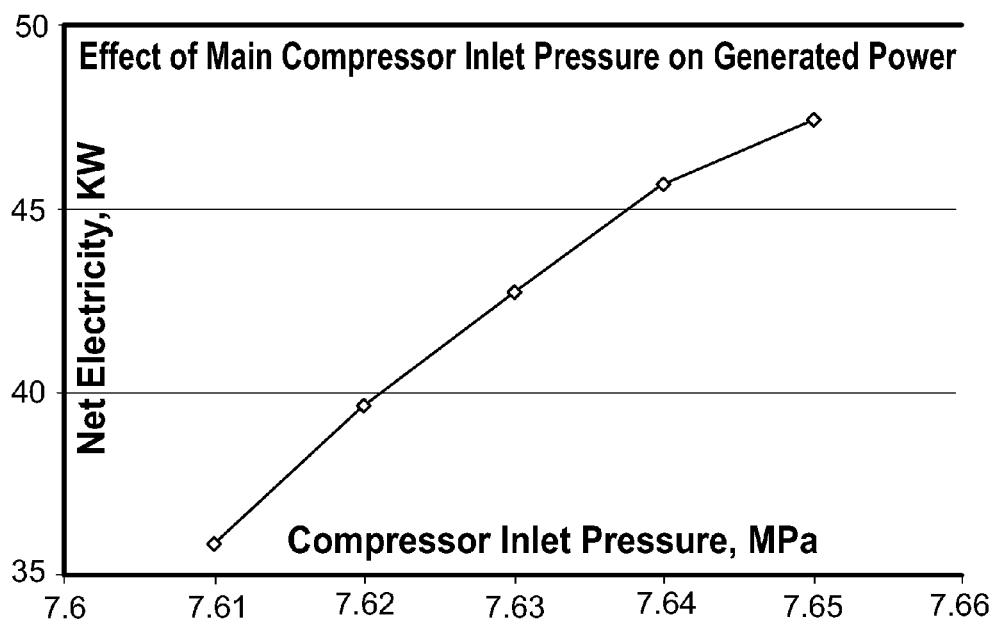

FIG. 4 shows the results of an application of the disclosed method of controlling start-up and steady state operating conditions set points to vary compressor inlet pressure and the effect on net electricity production.

The following discussion presents an example of the methodology according to an embodiment of the disclosure.

The control parameters used to define a steady state operating point to be balanced by the program are set in the input file, 'sf.in.' These parameters include main compressor inlet pressure (pcompa1), main compressor inlet temperature (tcompa1), TAC A speed (rpma), TAC B speed (rpmb), and heater discharge temperature (theat2). Other control parameters that reflect the characteristics of the loop include the fractional pressure drop across major components (dpfract), compressor and turbine geometries and performance characteristics (imc, irc, imt, irt), the recuperator UA values (UAhtr and UAltr), and leakage flows across the four labyrinth seals (wleakca, wleakcb, wleakta, wleaktb). Turbomachinery efficiencies can be modified from their calculated map efficiencies using the efficiency multipliers effmca, effmcb, effmta, and effmtb. Finally, there are thermal loss parameters with names that start with 'tloss.' These are explained in greater detail later.

The initial mass flow guess is 'w', with the iterative delta mass flow 'dw.' Iteration on mass flow continues until the mass flows guessed for the compressors are within epsilon (eps) of the mass flows calculated for the turbines. Finally, there is a parameter to select whether user-specified state point pressures are used, or if these are calculated using 'dpfract.' This is useful when trying to model test data.

Following is the sequence of the primary subroutines called, and the main functions performed therein according to an exemplary embodiment of the invention.
1. Program lso: begin algorithm
  1.1. Subroutine read2: read in scenario data and turbomachinery performance maps
2. Program lso: calculate pressure profile on low pressure leg
3. Program lso: initialize or increment tltlpr2 (set tcompb1=tltlpr2)
4. Program lso: initialize or increment w
  4.1. Subroutine sf4: initialize or increment fsplit
    4.1.1. Subroutine tacperf: calculate main compressor and recompressor performance
  4.2. Subroutine sf4: compare plthpr2 with pcompb2. If these pressures are within epsilon, continue to 4.3, otherwise return to 4.1
  4.3. Subroutine sf4: calculate pressure profile on the high pressure leg
    4.3.1. Subroutine tacperf: calculate main compressor turbine and recompressor turbine performance 5. Program lso: compare guessed compressor w with calculated turbine w. If these mass flows are within epsilon, continue to 6, otherwise return to 4.
6. Subroutine hxbalance: calculate recuperator performance
7. Program lso: compare guessed tltlpr2 with calculated value output from hxbalance in step 6. If these temperatures are within epsilon, then solution is found, continue to 8, otherwise return to 3.
8. Subroutine writer: write solution predictions to file.
9. Program lso: end.

State point properties for the locations indicated above are referenced by 'p', 't', 'd', 's', and 'h' for pressure, temperature, density, entropy, and enthalpy. These letters are prefixes to the location names. The numbers '1' and '2' indicate inlet and discharge of the component and are added as suffixes to the generic names. These prefixes and suffixes are used to make property names. For example, the density for the low pressure inlet to the high temperature recuperator is dhtlpr1. The generic names and the components or locations they reference are presented in Table 1, and are shown as generic locations on FIG. 1.

TABLE 1

| Generic Name | Component |
| --- | --- |
| compa | Main compressor |
| compb | Recompressor |
| turba | Main compressor turbine |
| turbb | Recompressor turbine |
| chill | Gas chiller |
| ltlpr | Low temperature recuperator, low pressure side |
| lthpr | Low temperature recuperator, high pressure side |
| htlpr | High temperature recuperator, low pressure side |
| hthpr | High temperature recuperator, high pressure side |
| heat | Heater |
| vola | Main compressor turbine inlet volute |
| volb | Recompressor turbine inlet volute |

The program also incorporates thermal loss mechanisms by stating the temperature decline leading up to a particular component. For example, tloss504 is the temperature reduction from the high temperature recuperator, high pressure side to the heater inlet. All thermal loss parameters start with the prefix 'tloss.' Leakage flows are controlled using variables that start with the prefix wleak, followed by two letters that indicate compressor A (main compressor), turbine A (main compressor turbine), etc.

According to an embodiment of the disclosure, the disclosed method uses component performance information and five user-defined operating point parameters (main compressor inlet temperature and pressure, heat discharge temperature, and rotor shaft speeds for each turbo-alternator-compressor) to determines cycle-wide balanced operating conditions.

According to another embodiment of the disclosure, the disclosed method may be used to calculate component and cycle performance at the resolved balanced operating point.

According to another embodiment of the disclosure, the disclosed method may be used to perform trade studies for cycle conditions and performance versus any user input or component performance model variations Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method, comprising:
a first step of providing a thermodynamic and mass flow model of a closed split flow recompression Brayton cycle power generation system;
a second step of inputting an estimate of the temperature at the exit of a low temperature recuperator;
a third step of inputting an estimate of total mass flow of the closed split flow recompression Brayton cycle power generation system;
a fourth step of inputting an estimate of a mass flow split between a primary and a secondary compressor;
a fifth step of calculating the primary compressor and the secondary compressor operating conditions from the thermodynamic and mass flow model based on input conditions;
a sixth step of comparing fluid pressure at the secondary compressor outlet calculated in the fifth step to the fluid pressure on the high pressure side at the low temperature recuperator outlet, and if those pressures not equal then inputting a new mass flow split into the fourth step, and if those pressures are equal then proceeding to a seventh step, and if not iteratively repeating the step until they are equal;
the seventh step that includes calculating primary turbine and secondary turbine operating conditions from the thermodynamic and mass flow model based on the input conditions;
an eighth step that includes comparing mass flow calculated by the thermodynamic and mass flow model to the mass flow estimate input in the third step, and if those values are equal, then proceeding to the ninth step, and if not equal then inputting a new mass flow into the third step until those values are equal;
a ninth step calculating high temperature and low temperature recuperator conditions;
a tenth step that includes comparing the outlet temperature of the exit of the low temperature recuperator calculated by the thermodynamic and mass flow model to the outlet temperature of the low pressure side of the low temperature recuperator estimated in step two, if those values are not equal, then returning to the second step and inputting a new estimate of the temperature at the exit of the low temperature recuperator until those values are equal, and then proceeding to the eleventh step; and wherein
the eleventh step identifies and produces start-up and steady state operating conditions set points that are used to start-up and operate the closed split flow recompression Brayton Cycle power generation system.

2. The method of claim 1, wherein the start-up and steady state operating conditions set points are selected from a group consisting of primary and secondary turbine-alternator-compressor speeds, heater input, mass flow split between the primary and secondary compressors, and amount of heat rejection.

3. The method of claim 1, wherein the primary compressor and secondary compressor operating conditions from the thermodynamic and mass flow model based on the input conditions include, but are not limited to primary and secondary turbine-alternator-compressor speeds, thermodynamic state, and mass flow.

4. The method of claim 1, wherein the primary turbine and secondary turbine operating conditions are selected from a group consisting of (inlet thermodynamic state, discharge pressure, and operating primary and secondary turbine-alternator-compressor speeds.

5. The method of claim 1, wherein the ninth step comprises:
- a first sub-step comprising inputting the temperature of the low temperature recuperator at the high pressure side inlet and the temperature of the high temperature recuperator at the low pressure side inlet into the thermodynamic, mass flow, and heat transfer models;
- a second sub-step inputting an estimate of the temperature at the outlet of the low temperature recuperator on the high pressure side;
- a third sub-step calculating the heat transfer rate (Q) from the high pressure side of the low temperature recuperator;
- a fourth sub-step setting the Q of the low pressure side of the low temperature recuperator equal to the calculated heat transfer rate from the high pressure side of the low temperature recuperator;
- a fifth sub-step inputting the outlet temperature of the low temperature recuperator on the low pressure side;
- a sixth sub-step calculating the inlet temperature of the low temperature recuperator on the low pressure side;
  - a seventh sub-step comparing the heat transfer rate for the high pressure side of the low temperature recuperator calculated from the heat transfer model portion of the thermodynamic model to the heat transfer rate from the thermodynamic state points and mass flow, and if the values are equal then proceeding to the eighth sub-step, or if not equal, then returning to the fifth sub-step and inputting a new outlet temperature of the low temperature recuperator on the low pressure side until the values are equal;
- the eighth sub-step calculating heat transfer rate from the low pressure side of the high temperature recuperator;
- a ninth sub-step of setting the heat transfer rate for the high pressure side of the high temperature recuperator equal to the calculated heat transfer rate from the low pressure side of the high temperature recuperator from the eighth step;
- a tenth sub-step of calculating the outlet temperature of the high pressure side of the high temperature recuperator;
- an eleventh sub-step of comparing the calculated heat transfer rate of the high temperature recuperator from the heat transfer model to the heat transfer rate of the high pressure side of the high temperature recuperator set in the ninth sub-step, and if those values are equal then proceeding to the twelfth sub-step, or if not equal, then returning to the second sub-step and inputting a new estimate of the temperature at the outlet of the low temperature recuperator on the high pressure side until those values are equal.

6. A non-transitory machine-readable medium in communication with at least one processor, the non-transitory machine-readable medium storing instructions, which, when executed by the at least one processor of a machine, causes one or more operating conditions to be determined and input as an operational parameter into the one or more operating conditions of a closed split flow recompression Brayton cycle power generation system;
wherein the one or more operating conditions are selected from a group consisting of primary and secondary turbine-alternator-compressor speeds, heater input, mass flow split between primary and secondary compressors, and amount of heat rejection; and
wherein the executing the instructions comprises:
- a first step of providing a thermodynamic and mass flow model of the closed split flow recompression Brayton cycle power generation system;
- a second step of inputting an estimate of temperature at an exit of a low temperature recuperator;
- a third step of inputting an estimate of total mass flow of the closed split flow recompression Brayton cycle power generation system;
- a fourth step of inputting an estimate of mass flow split between the primary and secondary compressors;
- a fifth step of calculating the primary and secondary compressors operating conditions from the thermodynamic and mass flow model based on the one or more input conditions;
- a sixth step of comparing fluid pressure at an outlet of the secondary compressor calculated in the fifth step to fluid pressure on a high pressure side at the low temperature recuperator outlet, and if those pressures not equal then inputting a new mass flow split into the fourth step, and if those pressures are equal then proceeding to a seventh step, and if not iteratively repeating the step until they are equal;
- the seventh step that includes calculating primary turbine and secondary turbine operating conditions from the thermodynamic and mass flow model based on the one or more input conditions;
- an eighth step that includes comparing mass flow calculated by the thermodynamic and mass flow model to the mass flow estimate input in the third step, and if those values are equal, then proceeding to the ninth step, and if not equal then inputting a new mass flow split into the fourth step until those values are equal;
- a ninth step calculating high temperature and low temperature recuperator conditions;
- a tenth step that includes comparing an outlet temperature of a low pressure side of the low temperature recuperator calculated by the system thermodynamic model to the outlet temperature of the low pressure side of the low temperature recuperator estimated in step two, if those values are not equal, then returning to the second step and inputting a new estimate of the temperature at the exit of the low temperature recuperator until those values are equal, and then proceeding to the eleventh step;
- the eleventh step identifies and produces start-up and steady state operating conditions set points that are used to start-up and operate the closed split flow recompression Brayton Cycle system.

7. The non-transitory machine-readable medium of claim 6, wherein the primary compressor and secondary compressor operating conditions from the thermodynamic and mass flow model based on the input conditions include, but are not limited to primary and secondary turbine-alternator-compressor speeds, thermodynamic state, and mass flow.

8. The non-transitory machine-readable medium of claim 6, wherein the primary turbine and secondary turbine operating conditions are selected from a group consisting of inlet thermodynamic state, discharge pressure, and operating primary and secondary turbine-alternator-compressor speeds.

9. The non-transitory machine-readable medium of claim 6, wherein the ninth step comprises:
- a first sub-step comprising inputting the temperature of the low temperature recuperator at the high pressure side inlet and the temperature of the high temperature recuperator at the low pressure side inlet into the thermodynamic, mass flow, and heat transfer models;

a second sub-step inputting an estimate of the temperature at the outlet of the low temperature recuperator on the high pressure side;

a third sub-step calculating the heat transfer rate from the high pressure side of the low temperature recuperator;

a fourth sub-step setting the heat transfer rate of the low pressure side of the low temperature recuperator equal to the calculated heat transfer rate from the high pressure side of the low temperature recuperator;

a fifth sub-step inputting the outlet temperature of the low temperature recuperator on the low pressure side;

a sixth sub-step calculating the inlet temperature of the low temperature recuperator on the low pressure side;

a seventh sub-step comparing the heat transfer rate for the high pressure side of the low temperature recuperator calculated from the heat transfer model portion of the thermodynamic model to the heat transfer rate from the thermodynamic state points and mass flow, and if the values are equal then proceeding to the eighth sub-step, or if not equal, then returning to the fifth sub-step and inputting a new outlet temperature of the low temperature recuperator on the low pressure side until the values are equal;

the eighth sub-step calculating heat transfer rate from the low pressure side of the high temperature recuperator;

a ninth sub-step of setting the heat transfer rate for the high pressure side of the high temperature recuperator equal to the calculated heat transfer rate from the low pressure side of the high temperature recuperator from the eighth step;

a tenth sub-step of calculating the outlet temperature of the high pressure side of the high temperature recuperator; and an eleventh sub-step of comparing the calculated heat transfer rate of the high temperature recuperator from the heat transfer model to the heat transfer rate of the high pressure side of the high temperature recuperator set in the ninth sub-step, and if those values are equal then proceeding to the twelfth sub-step, or if not equal, then returning to the second sub-step and inputting a new estimate of the temperature at the outlet of the low temperature recuperator on the high pressure side until those values are equal.

\* \* \* \* \*